Fig. 3.

INVENTOR.
David G. Davis.
BY John Ham
ATTORNEY.

INVENTOR.
David G. Davis.
BY John Flam
ATTORNEY.

Oct. 8, 1957  D. G. DAVIS  2,809,011
VALVE STRUCTURE HAVING SPHERICAL SEATS
Filed Sept. 10, 1951  11 Sheets-Sheet 4

INVENTOR.
David G. Davis.
BY
John Flam
ATTORNEY.

Oct. 8, 1957 D. G. DAVIS 2,809,011
VALVE STRUCTURE HAVING SPHERICAL SEATS
Filed Sept. 10, 1951 11 Sheets-Sheet 5

INVENTOR.
David G. Davis
BY
John Flam
ATTORNEY.

Oct. 8, 1957 D. G. DAVIS 2,809,011
VALVE STRUCTURE HAVING SPHERICAL SEATS
Filed Sept. 10, 1951 11 Sheets-Sheet 6

INVENTOR.
David G. Davis.
BY
John Flam
ATTORNEY.

Oct. 8, 1957 D. G. DAVIS 2,809,011
VALVE STRUCTURE HAVING SPHERICAL SEATS
Filed Sept. 10, 1951 11 Sheets-Sheet 7

Oct. 8, 1957 D. G. DAVIS 2,809,011
VALVE STRUCTURE HAVING SPHERICAL SEATS
Filed Sept. 10, 1951 11 Sheets-Sheet 8

INVENTOR.
David G. Davis.
BY
John Flam
ATTORNEY.

Oct. 8, 1957               D. G. DAVIS               2,809,011

VALVE STRUCTURE HAVING SPHERICAL SEATS

Filed Sept. 10, 1951                                         11 Sheets-Sheet 9

INVENTOR.
David G. Davis.
BY John Flam
ATTORNEY.

Oct. 8, 1957　　　D. G. DAVIS　　　2,809,011
VALVE STRUCTURE HAVING SPHERICAL SEATS
Filed Sept. 10, 1951　　　　　　　　　　　　　11 Sheets-Sheet 10

INVENTOR.
David G. Davis.
BY John Flam
ATTORNEY.

Oct. 8, 1957          D. G. DAVIS          2,809,011

VALVE STRUCTURE HAVING SPHERICAL SEATS

Filed Sept. 10, 1951          11 Sheets-Sheet 11

INVENTOR.
*David G. Davis.*
BY *John Flam*
ATTORNEY.

United States Patent Office 2,809,011
Patented Oct. 8, 1957

2,809,011
VALVE STRUCTURE HAVING SPHERICAL SEATS
David Goldberg Davis, Beverly Hills, Calif.
Application September 10, 1951, Serial No. 245,800
9 Claims. (Cl. 251—233)

This invention relates to valve structures, and particularly to structures having rotary plug closures, or gate valve closures.

Usually, an angularly adjustable closure is provided for a rotary plug valve. When the valve is open, the port through the closure is aligned with the ports in the valve body. When large ports are used, as, for example, twelve to thirty-six inches in diameter, the hydraulic pressure exerted on the closure, when the valve is closed, imposes a force that resists opening of the valve. Accordingly, to open the valve, it is essential to provide a mechanical effort of substantial magnitude.

It is one of the objects of this invention to make it possible to employ an opening force with a large mechanical advantage to crack the valve open, the mechanical advantage decreasing as the valve approaches fully open position.

It is another object of this invention to provide a valve of this character in which temperature changes within a relatively large range have no appreciable effect upon the operation of the valve.

In order to accomplish this result, the valve seat may be formed of a flexible member, such as of rubber or flexible metal. The flexibility of the seat readily ensures a final seal—so essential to provide a completely tight shut-off. Furthermore, the flexible seat precludes freezing of the valve closure after it has been standing for a long period of time.

When such flexible seats, having spherical surfaces, are used, no great precision or accuracy in the machining of the valve body is required, since the seat readily accommodates itself to the valve surfaces.

It is another object of this invention to reduce the effort of moving the plug to the open position, and especially by an unwedging effect between the plug and the body as the plug moves from the closed position. A tight seal is effected in this manner by inclining the seats in the body about an axis substantially coincident with the axis of plug rotation. When thus arranged, it is not essential to provide flexible seats on the plug, although the use of such seats results in permitting greater manufacturing tolerances without reducing the tightness of the closure.

When the flexible seats on the plug are used, there is a slight rubbing between the mating surfaces upon opening or closing the valve. It is another object of this invention to make it possible to move the flexible seat inwardly just as soon as the valve is cracked open. This result is accomplished by providing an axis of rotation of the plug seat that is slightly eccentric to the axis of the body seat. When the flexible seat is mounted on the body, an aspirating effect is used to reduce the fluid pressure underneath the flexible seat. This assists in moving the seat away from the plug. In this manner, the preloading of the valve can be increased.

Such an aspirating effect also has the advantage of reducing the tendency of the flexible seat to vibrate. This is especially important; because, as the plug approaches the fully closed position, the fluid passing through the valve is very turbulent.

It is another object of this invention to design the flexible seat itself in such a way that the turbulence cannot substantially extend to the underside of the seat, as by the use of a flange carried by the seat.

It is still another object of this invention to provide a valve of this character in which the plug wedges and seals in the open, as well as the closed position.

In order to acomplish this result, either the seats on the body or the seats on the plug are made of a yielding material, such as rubber; and seats on the body are movably mounted so as to adjust themselves to the plug in either open or closed position. Accordingly, it is another object of this invention to provide such pivotally mounted seats.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 4ᵃ is a fragmentary enlarged sectional view of a portion of the apparatus;

Figure 3:
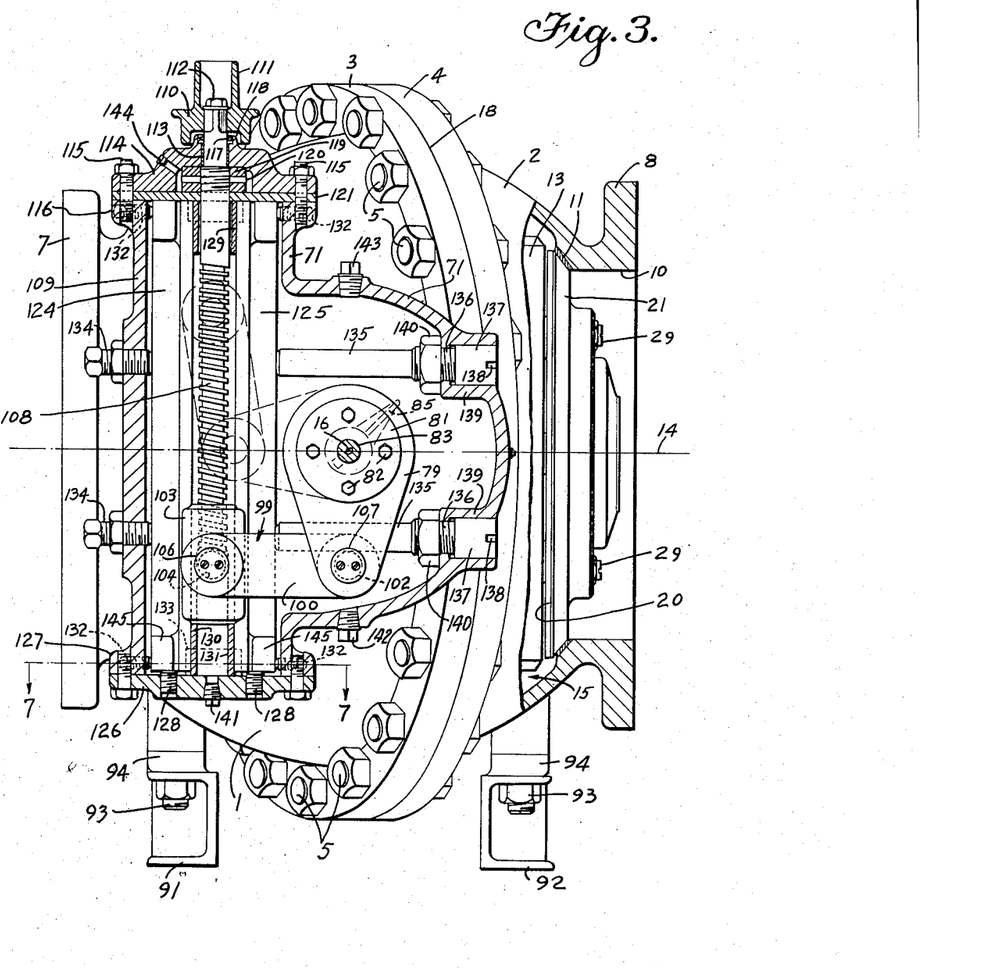
Fig. 3 is a sectional view, taken along a plane corresponding to line 3—3 of Fig. 1.
Figures 4, 4A:
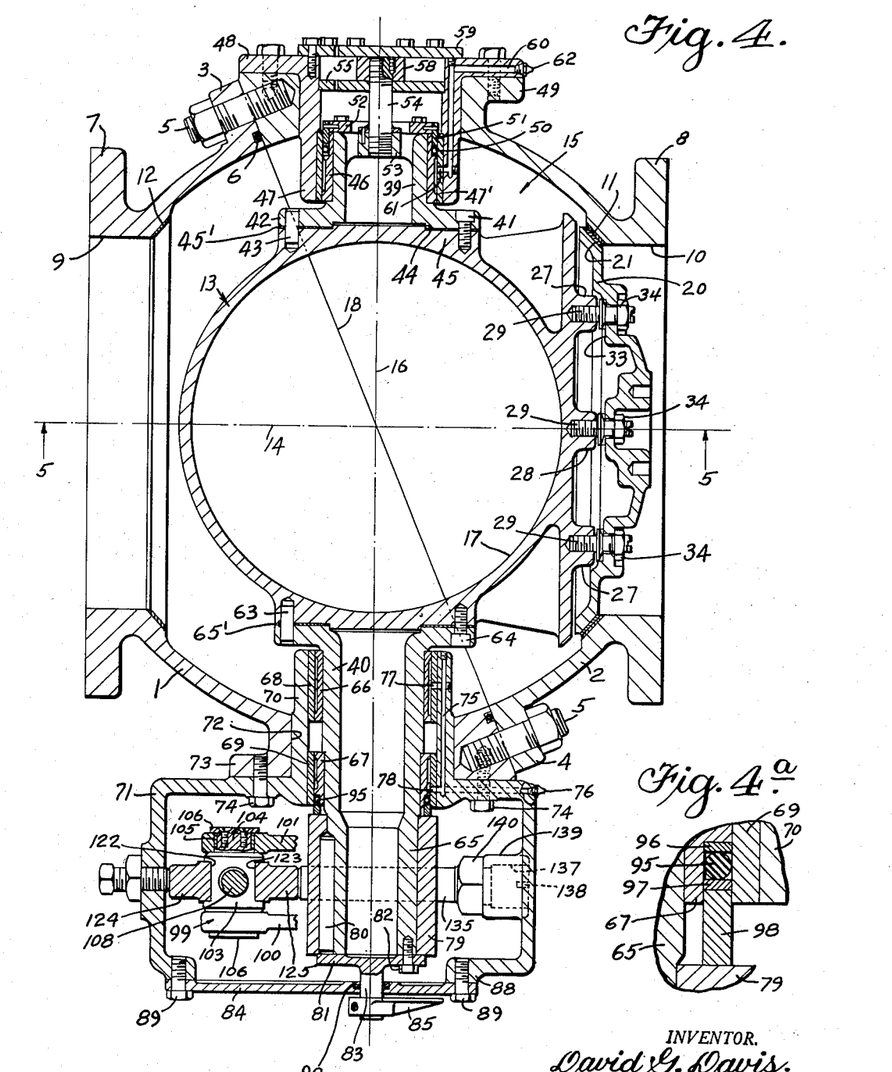
Fig. 4 is a horizontal sectional view, taken along a plane corresponding to line 4—4 of Fig. 2, the valve being shown in closed position.
Figures 5, 6, 8:
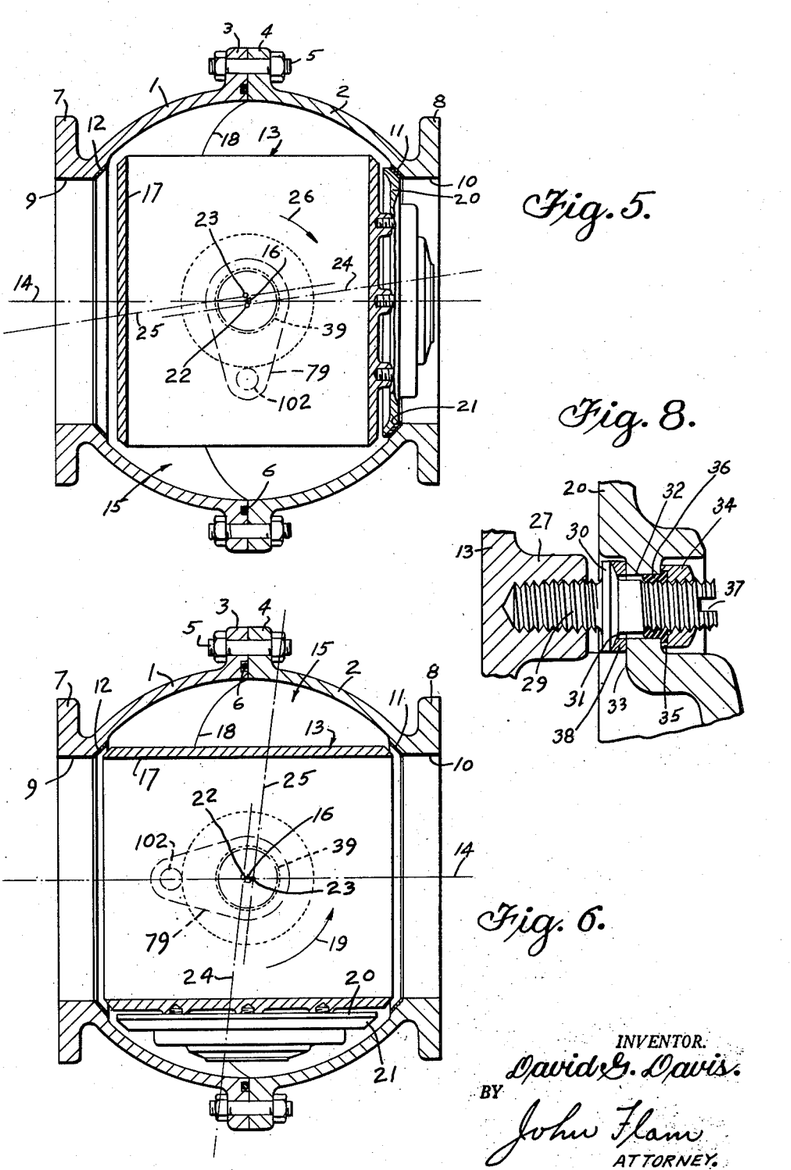
Fig. 5 is a sectional view, taken along a plane corresponding to line 5—5 of Fig. 4.
Fig. 6 is a view similar to Fig. 5, but illustrating the valve in open position.
Fig. 8 is an enlarged detail sectional view, illustrating the manner in which the sealing ring is attached to the plug.

In the form of the invention illustrated in Figs. 1 to 8, a split valve body is shown having the halves 1 and 2, forming an inner substantially spherical chamber 15. The split 18, in this instance, is diagonal to the axis 14 of the valve body 1—2. Each of these halves is provided, respectively, with an attaching flange 3 or 4, joined together as by a series of bolts 5. Interposed between the flanges is a sealing O-ring 6 (Figs. 4, 5, and 6).

Body half 1 is provided with a coupling flange 7 which may be connected to a conduit carrying the fluid to be controlled by the valve. The body half 2 is provided with a similar coupling flange 8.

Through flange 7 there is an opening 9, and a corresponding opening 10 is located through flange 8. Either one of these may correspond to the inlet or the outlet for the valve; in the present instance, opening 10 may be designated as the outlet. The inner edge of the opening 10 is shown as supporting an annular valve seat 11. This valve seat 11 has a sealing spherical inner surface, and is brazed, or otherwise attached, to the body around the opening 10. A similar valve seat 12 may be provided around the opening 9.

A hollow plug structure 13 is rotatably mounted so as to be movable within the chamber 15 on an axis 16 normal to the axis 14. This plug structure has a transverse through port 17 of generally cylindrical shape. In the open position of Fig. 6, this opening 17 is in alignment with the opening 9 and 10, thereby permitting the flow of fluid through the valve. As shown most clearly in Fig. 4, the axis 16 of rotation for the plug structure 13 intersects the axis of the openings 9 and 10 at the center of the transverse split 18.

In order to close the valve, the plug structure 13 is rotated in a counterclockwise direction, as indicated by the arrow 19 of Fig. 6, to bring the plug structure 13 to the position illustrated in Figs. 4 and 5. In order to provide a closure structure cooperating with the spherical seat 11, a sealing disc 20 is provided having brazed thereon a sealing ring 21. This sealing disc may be somewhat flexible and attached to the plug structure 13 in a manner to be hereinafter described. By making the disc 20 flexible, the mating spherical surfaces are resiliently urged together in the closing operation.

The center 22 of the spherical surface of the ring 11 is disposed slightly below the axis 16, as indicated in Fig. 5. This center also corresponds to the center of the external cylindrical surface of the sealing ring 21 when the valve is in the closed position of Fig. 5.

A sealing ring 12 around the edge of port 9 has a center 23 slightly above the axis of the plug rotation. Furthermore, the axis of symmetry 24 of the internal cylindrical surface of ring 11 is displaced by a small angle from the axis 14, and in a counterclockwise direction, as viewed in Fig. 5. Similarly, the axis of symmetry 25 of the internal cylindrical surface of ring 12 is displaced in a counterclockwise direction from the axis 14. These angular displacements of the axes of symmetry 24 and 25 are shown greatly exaggerated in Figs. 5 and 6. Actually, this displacement is of the order of one degree.

The valve may be opened by movement of the plug structure 13 in a clockwise direction, as viewed in Figure 5, and as indicated by arrow 26. In this opening movement, due to the eccentricity between the axis of rotation 16 and the centers of the mating surfaces on members 11 and 21, the valve is cracked open just as soon as the plug structure 13 is rotated from its fully closed position. Furthermore, in the movement of the plug structure 13 from the open position of Fig. 6, to the closed position of Fig. 5, a wedging action is provided between the spherical mating surfaces that ensures a firm sealing and seating.

The disc 20 is adjustably mounted upon the plug structure 13, so as to ensure accurate cooperation between the sealing surfaces. One manner in which this adjustable mounting may be secured is illustrated most clearly in Figs. 4 and 8.

Thus, the plug 13 is provided with a series of annularly arranged bosses 27 disposed around the axis 14, as well as a central boss 28. Studs 29 are threaded into these bosses 27, and are each provided with a flange 30 having a generally spherical or conical outwardly directed surface 31. Each of the studs 29 passes through a clearance aperture 32 in the disc member 20. Interposed between the inner surface 33 of the disc 20 and the surface 31 is a washer 38 having a spherical surface cooperating with the surface 31. A nut 34, having a flange 35, engages the outer end of the stud 29, and holds the ring 20 firmly against the surfaces 31. A yielding sealing bushing 36, confined by flange 35, is disposed in the clearance aperture 32, and underneath the nut 34. A split 37, provided at the end of each of the studs 29, makes it possible to lock the assembly in place by spreading the halves of the stud 29 apart.

Due to the clearance between the wall of aperture 32 and the stud 29, the sealing disc 20 may be readily tilted angularly in any direction by appropriate relative movement of the disc 20 with respect to the flanges 30 on the studs 29. The spherical seats between the surfaces 31 and the washers 38 facilitate this tilting adjustment. Also, within the limits of the clearance between the studs 29 and the apertures 32, limited lateral adjustment in any direction is also permitted.

The manner in which the disc 20 is mounted is especially useful for relatively large valves, such as those controlling an opening having a diameter of sixteen inches or more. By the aid of the numerous studs 29 disposed in annular arrangement, distortion of the disc 20 is prevented when subjected to the pressure of the fluid controlled over the large area of the disc.

The manner in which the plug structure 13 is rotatably mounted is shown to best advantage in Fig. 4. Thus, rotation about axis 16 is provided by the hollow trunnion extensions 39 and 40. Trunnion extension 39 is fixed to the plug structure 13 by a plurality of cap screws 41 passing through the flange 42 and attached to extension 39. One or more dowel pins 43 may be utilized to maintain this trunnion extension in proper position.

The flange 42 has a stepped portion 44 cooperating with a mating portion formed on the projection 45 integral with the plug structure 13. A gasket 45' is interposed between the adjacent faces of the flange 42 and the projection 45.

The trunnion 39 carries a bearing bushing 46, cooperating with bearing sleeve 47', supported on the inner surface of a bearing standard 47. This bearing standard has a flange 48 overlying the flange 49 provided on the body half 2. An oil sealing ring 50 is disposed around the reduced end of the bearing bushing 46, and is held in place by the lower edge of a ring 51. This ring 51 is pinned to an annular supporting ring 52 appropriately attached to the trunnion 39.

The trunnion 39 carries a central threaded boss 53 for the accommodation of a central stud 54. This stud 54 serves to hold a vented cover member 55 in place against a shoulder within the standard 47, as by the aid of a nut 58 appropriately locked to stud 54. A vented closing cover 59 extends across the outer open end of the standard 47.

The bearing surfaces may be oiled as by the aid of the oil ports 60 and 61. These oil ports communicate with the annular space formed between the bushings 46 and 47'. An appropriate coupling member 62 may be provided at the opening of the port 60 in the flange 48. For the purpose of lubricating and sealing, a heavy, waxy lubricant, such as used for sealing in a lubricated plug valve, may be used. This serves not only as a lubricant, but as a temporary seal while the valve is repacked under pressure.

The trunnion extension 40 is quite similarly supported upon the plug structure 13, and includes a dowel pin 63 and the cap screws 64. As before, a gasket 65' is interposed between the flange of extension 40 and plug 13. The trunnion 40 has a reduced end extension 65 which is capable of being coupled to the operating mechanism for the plug structure 13, all as described hereinafter.

The trunnion 40 is provided with a pair of axially spaced bearing sleeves 66 and 67 respectively cooperating with the bearing sleeves 68 and 69 mounted in a standard 70. This standard 70 is shown, in this instance, as formed integrally with a casing 71, shown also in Figs. 1, 2, and 3. The standard 70 is telescoped within a flanged opening 72 in the body half 1. The casing 71 may be attached to the flange 73, as by the aid of a plurality of screws 74 (see, also, Fig. 1).

The casing or housing 71 encloses the operating mechanism for the plug structure 13. The casing 71 and the standard 70, being formed as a unit, may be angularly adjusted with respect to the housing half 1, the increments of adjustment corresponding to the angular spacing of the screws 74. This may be useful to adjust the angular position of the valve body 1—2, as indicated, for example, in the phantom lines in Fig. 2. Thus, the casing 71 may be maintained in vertical position, and the valve body may be placed to cooperate properly with the inlet and outlet conduits.

Appropriate oiling provisions are made for the bearing surfaces. Thus, port 75 leads to the exterior of the casing 71, and leads to a coupler 76. This port 75 operates with ports 77 and 78, leading to the annular space formed between the reduced portions of the bearing sleeves 66 and 67. The same type of lubricant as mentioned in connection with coupler 62 may be utilized.

For operating the valve structure 13, a crank arm 79 is mounted upon the reduced end 65 of the trunnion 40. This crank arm, in the closed position of Fig. 5, extends downwardly and, in the open position of Fig. 6, extends to the left. It is joined to an extension 65, as by a dowel pin 80 (Fig. 4) which is disposed so that its axis extends along the mating surfaces between the crank 79 and the extension 65. A cap 81 is attached, as by screws 82, to the extension 65 and overlaps the outer edge of the crank 79. This cap 81 has an indicator shaft 83 extending through a cover 84 for the casing 71 (Fig. 4). A pointer 85 may be attached to the shaft 83, and may cooperate with the legends, such as 86 and 87, to indicate the position of the plug structure 13.

Cover 84 may be attached to the edge 88 of the casing or housing 71, as by a plurality of bolts or screws 89. The cover 84 may be appropriately sealed at its edges. An oil sealing ring 90 may be provided around the shaft 83 where it projects through the cover 84.

Figures 1, 2, 7:
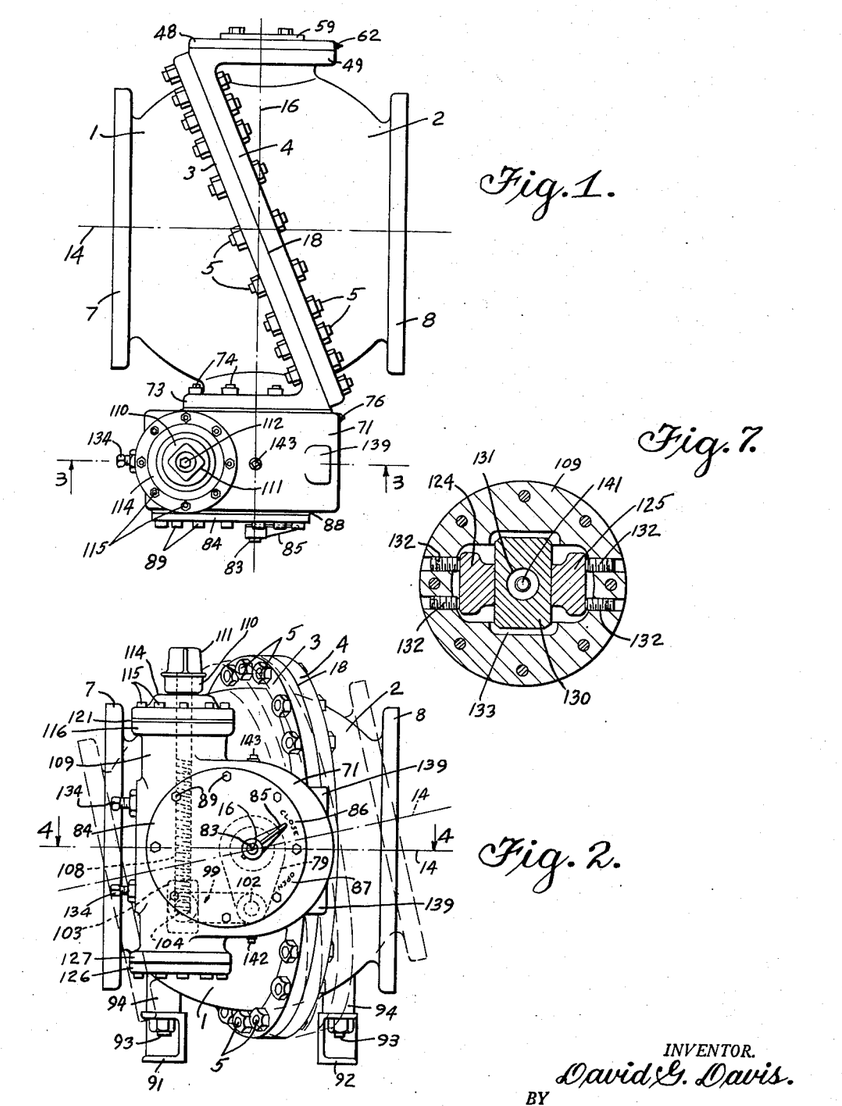
Figure 1 is a plan view of a valve structure incorporating the invention.
Fig. 2 is a front elevation thereof, the phantom lines being provided to illustrate how the operating mechanism may be angularly adjusted with respect to the valve body.
Fig. 7 is an enlarged sectional view, taken along a plane corresponding to line 7—7 of Fig. 3.

As shown most clearly in Figs. 2 and 3, the valve body 1—2 may be appropriately supported, as, for example, upon the channel irons 91 and 92. Through the upper flanges of these supports may pass the attaching bolts 93 for operating with appropriate bosses or feet 94 formed on the valve body.

In order further to seal the interior chamber 15 of the valve body, an oil seal ring 95 (Fig. 4) is disposed around the reduced lower portion of the bearing sleeve 67. It is disposed between the rings 96 and 97, and the outer ring 97 is held in place by the annular ring 98 which contacts the inner face of the crank 79.

The crank 79 may be given a ninety degree rotation from the closed position of Fig. 5 to the open position of Fig. 6 by the use of a link structure 99. This link structure 99 is composed of two parts 100 and 101 (Fig. 4). The link elements 100 and 101 are pivotally mounted upon a crank pin 102 projecting across the slotted end of the crank 79. The outer extremities of these link members 100 and 101 are similarly pivoted to a head 103. Since the pivotal connections at each end of the link structure 99 are similar, the structure shown in Fig. 4 serves, as well, to describe the structure for the pivoting of the link structure to the crank 79.

Thus, the head 103 (Fig. 4) has oppositely directed stub shaft extensions 104 over which a bearing sleeve 105 is placed. The ears of link structure 100 and 101 are disposed over these projections, and held in place by cover plates 106 which overlap the sleeves 105. A similar cover plate 107 (Fig. 3) is utilized for holding the crank pin 102 against axial movement.

In the closed position of Figs. 3 and 5, the link structure 99 is disposed so that it extends normal to the direction of the crank 79. The head 103, however, may be raised so as to move the link structure 99, as indicated by the phantom lines in Fig. 3. The distance between the centers of the shafts 104, carried by the head 103, and the axis of crank pin 102 is somewhat greater than the distance between the axis 16 of the plug structure and the axis of crank pin 102. Thus, they are in the ratio of about 4 to 3. Accordingly, the angular movement of the crank 79 through ninety degrees, as indicated by the phantom lines in Fig. 3, corresponds to the phantom line position of the link structure 99. In this position, the link structure extends somewhat obliquely to the axis 14 of the valve body.

The head 103 may be raised and lowered by the aid of a lead screw 108 which is threaded into the head 103. This lead screw is supported within the cylindrical portion 109 of the casing 73 (see, particularly, Figs. 1 and 3). This lead screw may be operated by any power means, such as hydraulic or electric, or manually, as by the aid of a wrench accommodating member 110. This member is attached to a square end 111 of the screw 108, as by the clamp screw 112.

The lead screw 108 is journalled in a bearing sleeve 113 disposed in a standard 114. The base of this standard 114 is attached, as by bolts 115, to the flange 116 on the casing 71. An oil seal ring 117 is disposed in a boss 118 formed around the sleeve 113.

A collar 119 is threaded on the lead screw 108 below the standard 114. This collar is pinned to the lead screw 108 by the aid of a diametrically arranged pin 120. A plate 121 serves to provide a flat lower surface for maintaining guides in position for the head 103.

The head 103, as shown most clearly in Fig. 4, has opposite longitudinal grooves 122 and 123 in which are accommodated the guide rails 124 and 125 respectively. These guide rails are clamped between the upper plate 121 and lower cover member 126 mounted upon the lower flange 127 of the cylindrical portion 109 (Fig. 3). Thus, a plurality of headless screws 128 passes through cover 126 to engage the lower feet 145 of these rails against the lower surface of the plate 121.

Further to maintain these rails 124 and 125 in accurately adjusted position, use is made of an upper apertured spacer block 129 and a lower spacer block 130. The spacer block 130 is shown in Fig. 7. It is engaged by the opposed flat surfaces of the rails 124 and 125, and is provided with an aperture 131. The upper end of this block also serves as a stop for the head 103 to limit the downward movement of the head to the position indicated in Fig. 3. The upper block 129 is similarly arranged.

Both of the rails 124 and 125 may be transversely adjusted and secured in adjusted position against the blocks 129 and 130, as by the headless screws 132. This adjustment is permitted by the clearance recesses 133 in the wall of casing member 109, and is shown in Fig. 7 and, as indicated by the corresponding dotted lines, in Fig. 3. A plurality of other adjusting screws 134 (two in this instance), spaced along the rail 124, is provided engaging the left-hand end of this rail. These screws are accommodated in the wall of casing member 109. Opposite these adjusting screws 134 are struts or bars 135 engaging the rail 125. These bars are quite rigid, and are provided with threaded shoulders 136 and cylindrical heads 137. These cylindrical heads may be slotted, as indicated at 138, for the accommodation of a screw driver for adjustment within the threaded bosses 139 formed in the casing 71.

Lock nuts 140 maintain these abutments in adjusted position.

By careful adjustment of the set screws 132 at the upper and lower portions of the guide rails 124 and 125, as well as by proper adjustment of the screws 134 and the struts 135, the motion of the head 103 is confined accurately to the prescribed path.

As heretofore stated, the spacer block 130 serves as a limit for the downward movement of the head 103. The lower surface of the spacer block 129 similarly operates to limit the upward movement of the head 103. In this way, the free movement of the crank through a ninety degree path, is maintained in spite of transverse forces that may be imposed upon the head 103 in the process of moving this head.

Plugs 141 and 142 (Fig. 3) are provided respectively through the plate 126 and in the lower portion of the casing 71 for draining any accumulated liquid or fluid that may have escaped into the casing. A closure plug 143 is indicated opposite the plug 142. A small plug 144 is provided in a bearing standard 114 for oiling, or the like.

Figs. 9 to 14 illustrate modifications of the flexible sealing ring.

Figure 9:
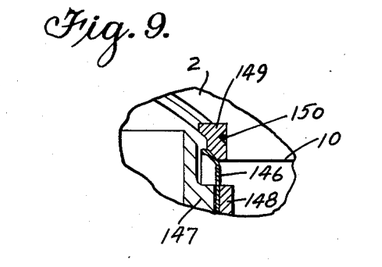
Figs. 9 to 14 are detail sectional views, illustrating modified forms of the sealing rings.

Thus, in Fig. 9, the sealing ring 146 is made of flexible metal. It is held to the plug structure 147 by the aid of a clamping ring 148. The seat 149, in this instance, is formed as a separate ring held in place in any appropriate manner, and has a groove in which a packing ring 150 is provided.

Figure 10:
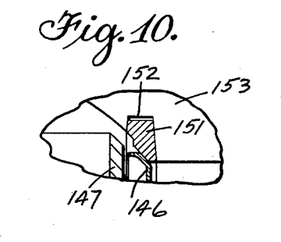

In Fig. 10, the flexible sealing ring 146 cooperates with the seat 151 accommodated in a recess or groove 152 in the valve body member 153. This seat 151 is tapered, and wedges into the tapered recess 152.

Figure 11:
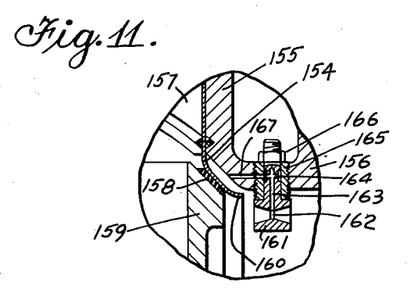

In Fig. 11, the flexible sealing ring 154 is clamped between a flange 155 of the outlet port forming member 156, and the body half 157. It cooperates with a rubber sealing ring 158 mounted on the plug structure 159.

The sealing ring 154 has an outwardly turned flange 160 to limit tthe flexing of the ring against the inner surface of the member 156.

An aspirating device is also included. This includes the venturi tube 161, having a constricted passage 162, and arranged in the flow of liquid through the member 154.

The passage 162 is connected, as by a port 163, to a transverse port 164 formed in the body of the venturi. This body is accommodated in a threaded sleeve 165 supported in the member 156. A nut 166 holds the body of the venturi 161 in place against the lower end of the threaded sleeve 165.

The port 163 communicates with the transverse port 164 in the venturi member which is in communication with the port 167 leading to the space between the flexible member 156 and the flange of the member 162.

As the liquid flows through the venturi opening 162, it creates a partial vacuum tending to withdraw liquid through the ports 167, 164, and 163, thereby reducing the fluid pressure back of the ring 154. Accordingly, the opening movement is facilitated; for, just as soon as the valve is cracked open, the aspirating effect is operative to facilitate flexure of the ring 154 and free it from the rubber sealing ring 158.

Figure 12:
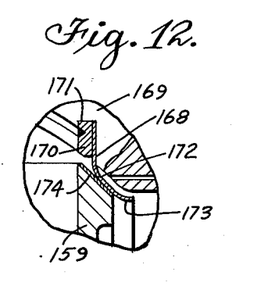

In the form shown in Fig. 12, the seat ring 168 is supported in the body half 169 by the aid of an annular clamping ring 170 accommodated in a groove 171 in the body members. This sealing ring 168 has a conical portion 172 with an outwardly turned flange 173 to define a space in which the aspirating effect takes place. Plug structure 159, in this instance, carries a metal sealing ring 174 that may be permanently attached to the plug 159.

The plug 159, as shown in Figs. 11 and 12, is provided with a tapered edge for the accommodation of the conical rings 158 and 174.

Figure 13:
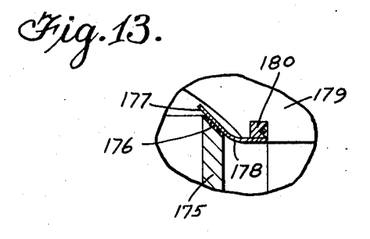

In Fig. 13, the plug structure 175 carries the conical rubber sealing ring 176, cooperating with the free conical edge 177 of the sealing ring 178. This sealing ring is attached to the body halves 179, as by being welded or soldered to a metal supporting ring 180 accommodated in a groove in the members.

Figure 14:
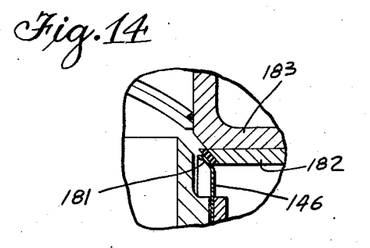

In the form of Fig. 14, the metal sealing ring 146 is the same as the rings provided in the form shown in Fig. 9. The cooperating rubber seat 181, however, is supported on the end of a sleeve member 182 telescoping within the member 183 that forms the outlet opening.

Figure 15:
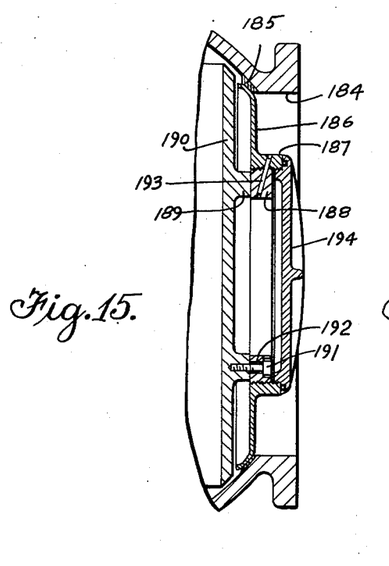
Figs. 15 and 16 are sectional views, illustrating modified forms of the means for attaching the seat to the plug.

Another manner of adjustably mounting the valve closure disc is illustrated in Fig. 15.

Annularly arranged around the valve opening 184 is a spherical valve seat 185. With this valve seat there coperates a flexible sealing member 186, generally of the same character as hereinbefore described.

The sealing member 186 is shown in valve closing position. This sealing member is so arranged that it may be adjusted both axially and laterally of the axis of opening 184 in order that it may accurately seat upon the seat 185. For this purpose, the sealing member 186 has a hub 187 which is internally threaded. The internal threads cooperate with the external threads of a ring 188. This ring 188, in turn, is bolted to the flange 189 of the plug 190, as by the aid of the cap screws 191. These cap screws 191 pass through relatively large clearance apertures 192 in the ring 188.

Accordingly, in order to adjust the position of the sealing member 186 in an axial direction, this sealing member may be turned relatively to the ring 188. It is advanced or retracted about the axis of the screw threads. Lateral adjustment is permitted by the clearance apertures 112 which permit adjustment in any angular direction. When this adjustment is completed, the cap screws 191 are tightened, and a locking pin 193 is driven through the hub 187 and the ring 188.

A cover member 194 may be threaded into the hub 186.

Figure 16:
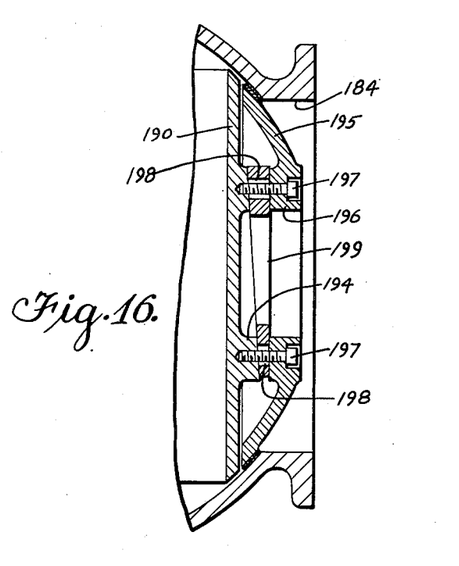

Alternatively, the lateral and axial adjustment may be accomplished by the aid of a structure illustrated in Fig. 16. In this instance, the plug 190 is provided with a flange 194 that has an annular surface having a slight slope. The sealing member 195 in this instance is formed as a rigid member having a hub 196. Passing longitudinally through apertures in the hub 196 are a plurality of cap screws 197. These screws also pass through large clearance apertures 198 in a wedge structure 199. This wedge structure is of annular shape. The right-hand surface of this wedge 199 is generally perpendicular to the axis of the plug 190. The left-hand surface, however, has a slope of about five degrees with respect to the right-hand face. The face of flange 194 is sloped at a slightly greater angle, say, five and one-half degrees. In this way, the right-hand surface of the wedge is inclined by one-half degree to the vertical; and this inclination is a counter-clockwise direction. Due to this arrangement, the sealing member 195 moves rapidly away from its seat as the valve is opened.

Obviously, axial adjustment of the sealing member 195 is provided by withdrawing the wedge 199, or moving it inwardly while the screws 197 are loosened.

Figures 17, 18:
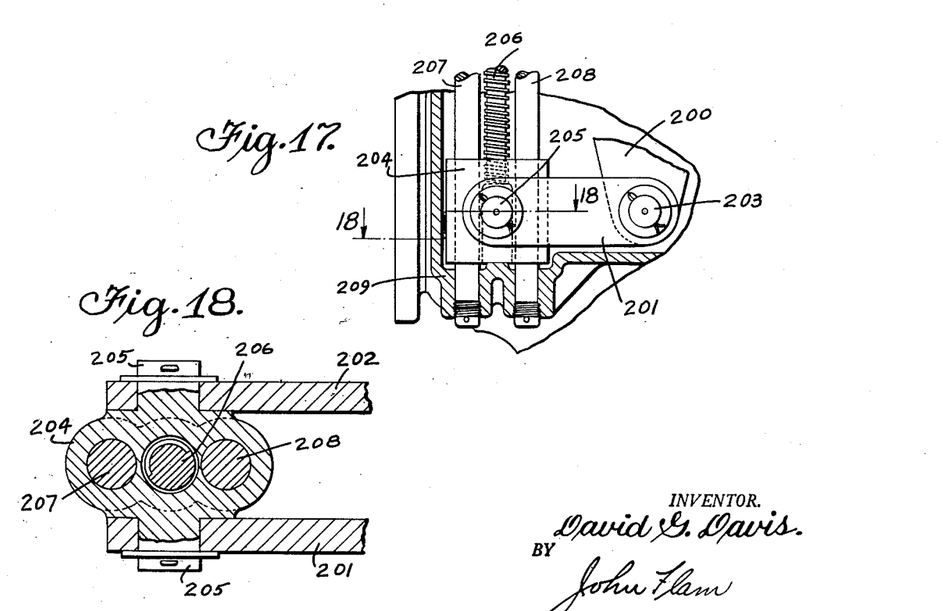
Fig. 17 is a fragmentary section, similar to Fig. 3, of a modified form of mechanism for operating the plug.
Fig. 18 is a sectional view, taken along a plane corresponding to line 18—18 of Fig. 17.

The mechanism for rotating the plug structure 13 is illustrated in Figs. 17 and 18. Thus, the trunnion 40 carries a crank 200 which may be similar to the arm 79 of the form shown in Figs. 1 to 8. This arm 200 is pivotally connected to a pair of links 201 and 202.

For this purpose, pins 203, one on each side of the crank 200, are utilized. The links 201, 202 are correspondingly pivoted on opposite sides of the head 204 by the aid of stub shafts 205. Through this head extends a lead screw 206 capable of being driven manually or otherwise.

In order to guide the head 204, a pair of guide pins 207 and 208 extends vertically through appropriate guide apertures in the head 204. These guide rods are threaded through lower extremities into the casing 209.

Figure 25:
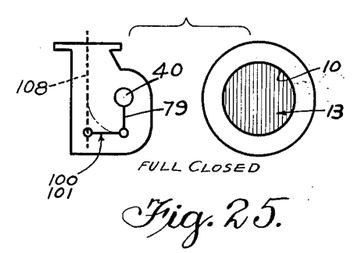
Figs. 25 to 29, inclusive, are diagrammatic views illustrating the relationship of the stroke of the opening mechanism with the opening movement of the plug.

The opening movement of the crank arm 79, link structure 100—101, and screw 108 is diagrammatically illustrated in Figs. 25 to 29. In Fig. 25, the arm 79 extends vertically downwardly, and the link structure 100, 101 is horizontal. The lead screw 108 is also shown as vertical, hence is parallel to the crank 79, and the link 100, 101 is perpendicular to both the lead screw (representing the line of travel of the link) and the crank. It also follows from this relationship that the line of travel of the link along lead screw 108 is a line tangent to a circle having as its center the pivotal union of the crank 79 and link 100, 101, when the valve is closed, as in Fig. 25, and said circle having as its radius the length of the link 100, 101 between the pivotal connection thereof with the crank 79 and the connection thereof with the lead screw 108. The length of the link 100—101 is shown in these diagrams as approximately the same as the length of arm 79. However, the same general discussion applies even when the link is slightly longer.

Figure 26:
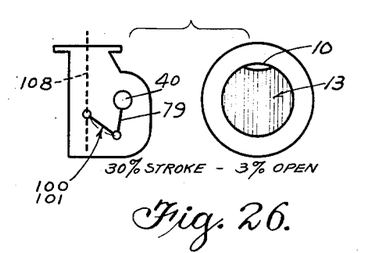

In Fig. 26, the screw 108 is moved through thirty per cent of its stroke. The link 100—101 now extends upwardly, and the arm 79 has moved in a clockwise direction. The valve, however, is only opened to the extent of three percent. Accordingly, a considerable mechanical advantage is provided to crack the valve open.

Figure 27:
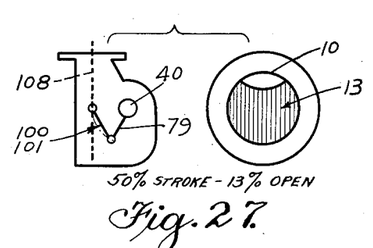

The fifty percent stroke position is indicated in Fig. 27. In this position, the valve is opened to the extent of thirteen percent. The mechanical advantage is still substantial.

Figure 28:
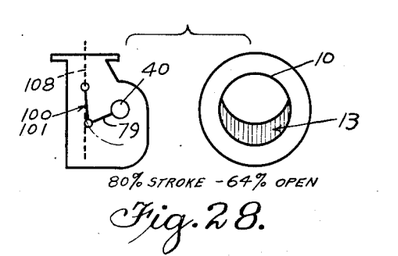

At eighty percent of its stroke, as illustrated in Fig. 28, the link structure 100—101 approaches the vertical, and the arm 79 approaches the horizontal, and the valve is about sixty-four percent open. Full opening position is shown in Fig. 29.

Figures 29, 30:
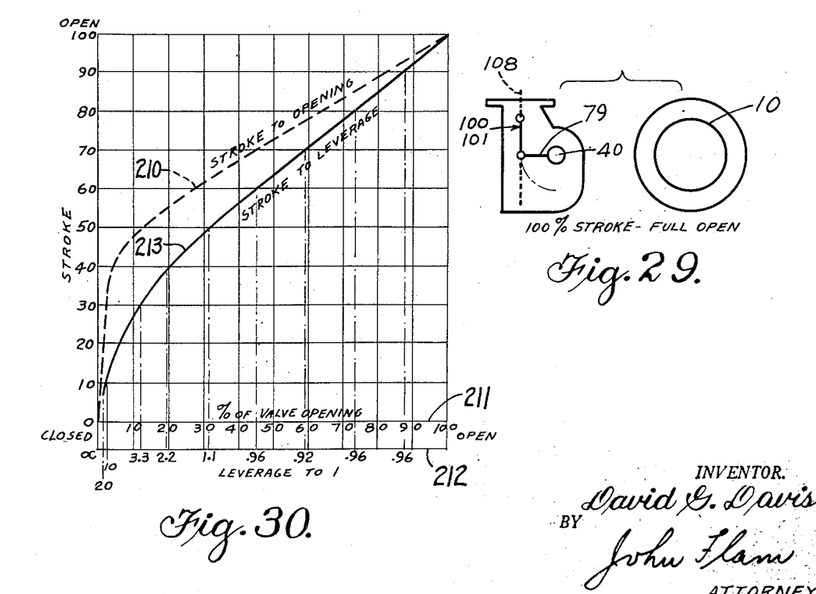
Fig. 30 is a graph showing the relation between the stroke of the opening movement to the degree of opening of the valve, as well as the relationship of the stroke to the leverage.

The relation of the stroke to the opening is shown in the graph of Fig. 30, where the ordinates of dotted curve 210 indicate the percentage of stroke, and the abscissae along the line 211 indicate the percentage of valve opening.

The corresponding leverage is indicated by the abscissae along the line 212 of the full line curve 213. It is there seen that the leverage in and near the closed position is quite high. Thus, the leverage is twenty to one at a position of the stroke corresponding to about seven percent. This leverage ultimately reaches unity at the open position.

It has been found that, when the link 100—101 is about three-fourths the effective length of crank 79, the high mechanical ratio for opening the valve from fully closed position is effective for a larger portion of the opening movement.

Figure 20:
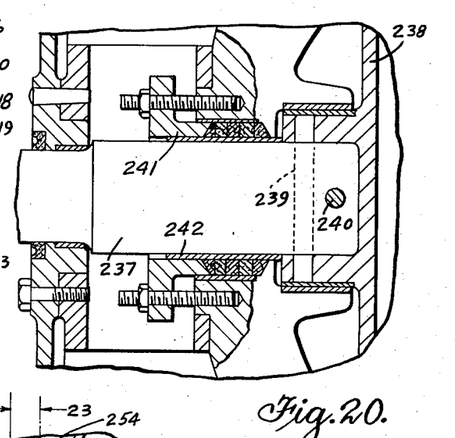
Figure 21:
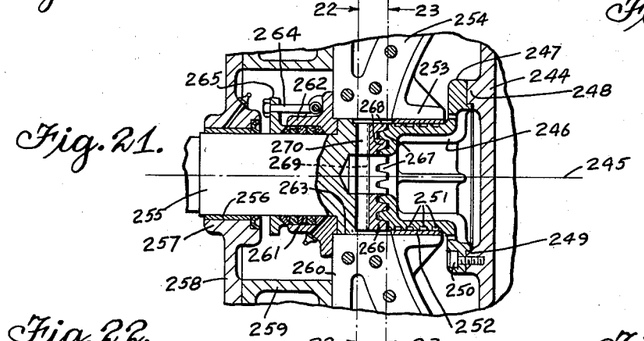

Other forms of bearing supports for the shaft of the plug structure may be used. Modifications are shown in Figs. 19, 20, and 21.

Figure 19:
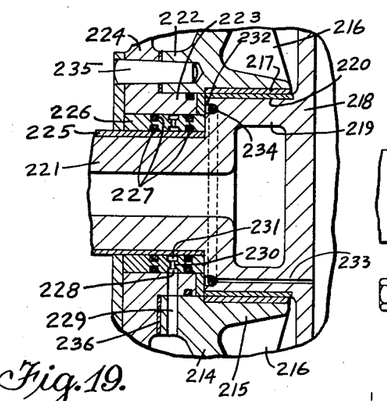
Figs. 19 to 21 are fragmentary sectional views, illustrating modified forms of bearing structures for the plug.

In Fig. 19, the valve body member 214 has an inwardly directed bearing boss 215. Ribs 216 reinforce the boss 215. This boss 215 is lined with a bearing sleeve 217. The plug 218 has a corresponding hollow shaft portion 219 carrying a cooperating bearing sleeve 220.

The shaft portion 219 has a reduced portion 221 that extends through the exterior boss 222 on the body member 214. Shaft extension 219 also passes through the hub 223 formed on a hollow casing 224 that houses the operating mechanism for the plug 218.

Hub 223 telescopes within the boss 222. The shaft extension 221 carries a bearing sleeve 225 cooperating with a bearing sleeve 226 interposed between the hub 223 and the sleeve 225. This sleeve 226 may have a plurality of appropriate oil sealing rings 227 disposed on its external periphery and on its internal periphery. A groove 228 on the exterior sleeve 226 communicates with the apertures 229 and 230 to the exterior of the body casing 214 for draining any liquid that may pass between the sleeves 225 and 226. This annular groove 228 may be connected by a plurality of apertures 230 with an internal groove 231 on the sleeve 226.

The hub 219 has an annular channel 232 communicating, as by an aperture 233, to the interior of the plug 218. Within this channel 232 is a sealing ring 234 that seals against the egress of liquid through the opening 233.

The hollow casing 224 is attached to the hub 222 by the aid of a plurality of bolts, and dowel pins 235. An annular gasket 236 may be interposed between the casing 224 and the end surface of the hub or boss 222.

In the form shown in Fig. 20, the shaft 237 for the plug structure 238 is formed separately from the plug structure, and is joined to it as by the cross pins 239 and 240.

In order to provide a fluid-tight structure, a packing gland 241 is provided around the bearing sleeve 242 of shaft 237.

In other respects, this structure is similar to that disclosed in Figs. 1 to 8.

In order to mount the plug 244 rotatably in the valve body, the plug structure 244 is provided with trunnions on opposite sides thereof, and on the axis 245 of plug rotation.

The trunnion for the left-hand side of the plug 244, as viewed in Fig. 21, is formed by a casting 246. This casting 246 has a flange 247 overlying an annular flange 248 formed integrally with the plug structure 244. This flange 248 has a projection 249 telescoping within the flange 248. Fastening cap screws 250 hold the trunnion structure 246 in attached position.

The trunnion structure 246 has a grooved external cylindrical surface 251 journaled in a sleeve 252 mounted on the boss 253. This boss 253 is formed by valve body halves, one of which is shown at 254. The rotation of the plug 244, to close and open the valve, is accomplished by the aid of a shaft 255. This shaft 255 is coupled to the trunnion 246 in a manner to be hereinafter described.

Shaft 255 is journaled in a sleeve 256 supported in the central hub 257 of a casing 258 that houses the plug operating mechanism. This casing 258 is attached to an intermediate spacer member 259. Spacer member 259 is attached to the left-hand end of a flange 260 formed on the valve body halves. Surrounding the shaft 255 is packing 261 located in a gland 262. This gland 262 has a right-hand projection telescoping within the bore 263 formed around the axis 245 in the body halves. The packing material 261 may be held in compressed position by the aid of a plurality of bolts 264 mounted on the gland 262 and passing through a packing ring 265.

The coupling between shaft 255 and trunnion 246 is effected by a coupling member 266 (see, also, Figs.

Figure 22:
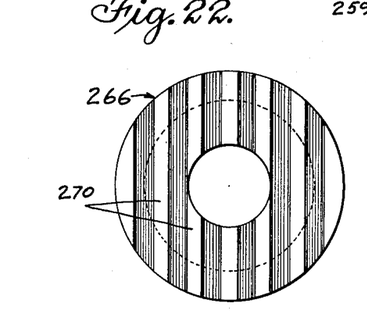
Fig. 22 is a view, taken generally along a plane corresponding to line 22—22 of Fig. 21, and illustrates one face of a shaft coupling member.
Figure 23:
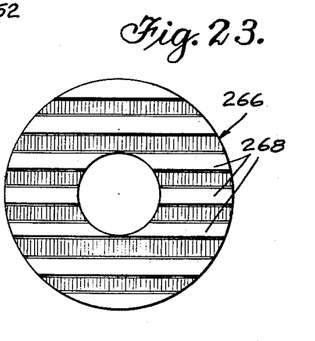
Fig. 23 is a view, taken along a plane corresponding to line 23—23 of Fig. 21, illustrating the opposite face of the coupling member.
Figure 24:
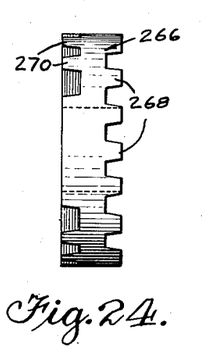
Fig. 24 is a side elevation of the coupling member.

22, 23, and 24). This coupling member provides a driving connection from the shaft 255 to the trunnion 246 even when the axes of the trunnion 246 and of the shaft 255 may be slightly misaligned. This coupling member 266 compensates for this misalignment, and no undue strains are placed upon the plug structure and its trunnions. For this purpose, the left-hand longitudinal face of trunnion 246 is provided with a series of parallel projections 267. These projections 267 are transverse to the axis of the trunnion 246, and are arranged to interfit between corresponding projections 268 on the right-hand face of the coupling member 266. This provides a driving connection from the coupling 266 to the trunnion 246 while still permitting horizontal misalignment between the axis of the coupling 266 and the axis of trunnion 246.

Similarly, the inner face of shaft 255 is provided with a plurality of parallel projections 269. These projections 269 are at right angles to the projections 267. They interfit with the corresponding projections 270 on the coupling member 266. Since these projections 269 extend in a vertical direction, misalignment of the axes vertically is compensated.

The mode of assembly of this structure, as thus far described, is quite simple. The trunnion 246 is assembled with the boss 253. Then, the coupling 266 is inserted and the shaft 255 is placed within the bore 263. The packing gland structure, the spacer 266, and the casing 258 can then be readily assembled.

This flexible coupling reduces manufacturing costs, due to easier and simpler machining, since no extreme care need be taken to ensure accurate concentricity of the trunnion 246 and shaft 255. Furthermore, the plug 244 can be readily hydraulically balanced as, for example, by the aid of the bleed holes 271, and there is consequently less wear on the valve seats. Furthermore, the shaft 255 finds its own center in the stuffing box structure and, consequently, has a longer life.

Figures 31, 32, 33:
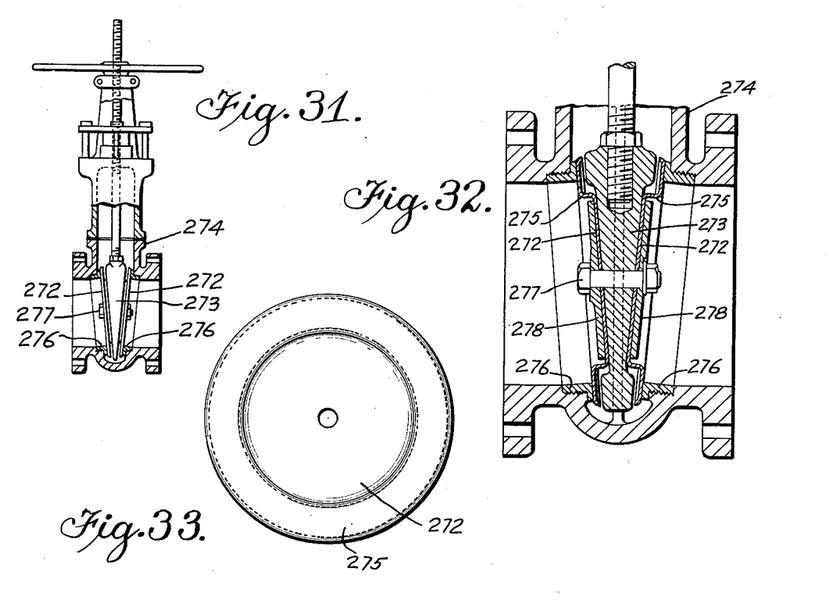
Fig. 31 is a sectional view, illustrating an additional form of the valve and its closure shown in closed position.
Fig. 32 is an enlarged view similar to Fig. 31.
Fig. 33 is a plan view of a metallic resilient seat member used in the valve shown in Figs 31 and 32.

The use of a flexible sealing ring is not confined to the type of valves hereinabove described. In Figs. 31, 32, and 33, a gate valve structure is illustrated in which flexible metal rings 272 are illustrated as joined to the opposite sides of the gate closure member 273 in the gate valve structure 274. The specific details of the gate valve structure may be of conventional form. The flexible rings 272 have free peripheral flanges 275 that can accommodate themselves in a tight manner to the seats formed by the member 276 threaded into the valve body. These rings 272 are joined to the gate closure 273, as by through bolt 277, which serves to urge the clamping members 278 together along the sloping sides of the gate member 273.

Figure 34:
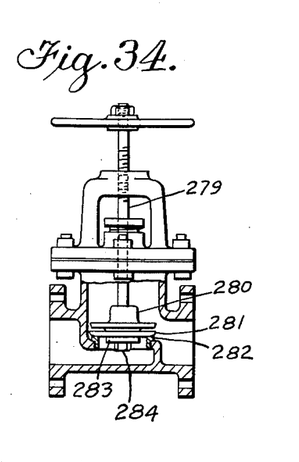
Fig. 34 is a view, partly in section, of another form of valve embodying a feature of the invention.
Figure 35:
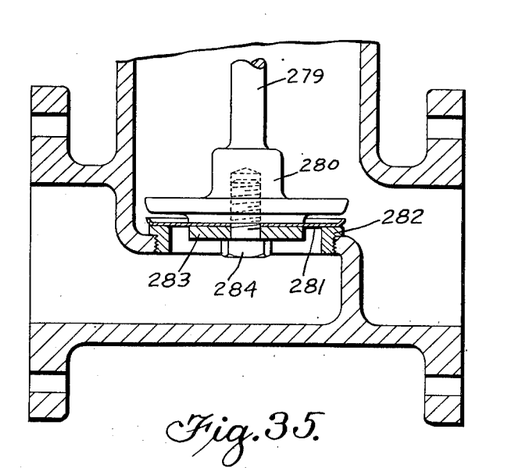
Fig. 35 is an enlarged fragmentary, sectional view of the valve shown in Fig. 34.

A similar arrangement is effective for a globe valve structure, as shown in Figs. 34 and 35. Here, the valve stem 279 carries a closure structure including a flanged member 280, to which is attached a flexible metal sealing ring 281. The outer edge of this flexible sealing ring cooperates with a seat 282, and is held to the member 280 as by the clamping rings 283 and the screw 284. The edges of the flexible ring 281 are free to flex and accommodate themselves accurately to the seat 282.

In the form shown in Figs. 36 to 40, inclusive, the valve body is made up of the two halves 285 and 286. Body half 285 carries the integral extension 287, having a port 288. Similarly, body half 286 has the integral extension 289, having a port 290. These ports are axially aligned, and are controlled by the plug structure 291, having a through port 292.

The plug structure 291 is rotatable about an axis 293. In order to open the valve from the closed position of Fig. 36, the plug structure is rotated through an angle slightly less than ninety degrees, since the axis of port 292, in the closed position, is oblique to the axis of the ports 288 and 290.

The plug structure 291 carries the sealing spherical zone surface 294 that has an axis 295 slightly displaced from the axis of the ports 288, 290. This spherical zone 294, in the closed position of Fig. 36, mates with a corresponding spherical zone surface 296 formed on a seat member 297.

Figure 36:
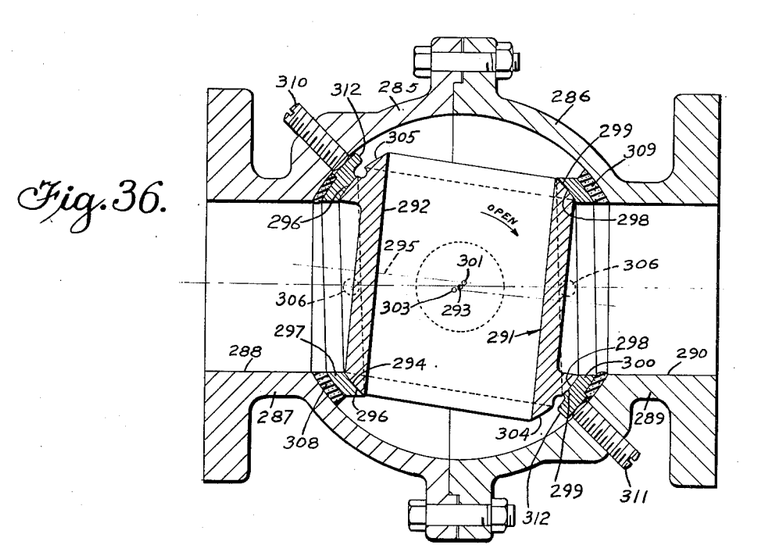
Fig. 36 is a sectional view, mainly diagrammatic, of a modified form of valve shown in the closed position.

Similarly, opposite the spherical zone 294 of plug 291 is a spherical zone 298 which, in the closed position of Fig. 36, mates with a corresponding spherical zone 299 carried by a seat-carrying member 300.

It is noted that the spherical surface 294 has a center 301 (see, particularly, Fig. 39) where the radius 302 of the surface 294 is indicated. Similarly, the axis of spherical surface 298 is at the point 303 which is offset from the axis 293 of the plug 291, and in the opposite direction from the center 301.

Figures 38, 39, 40:
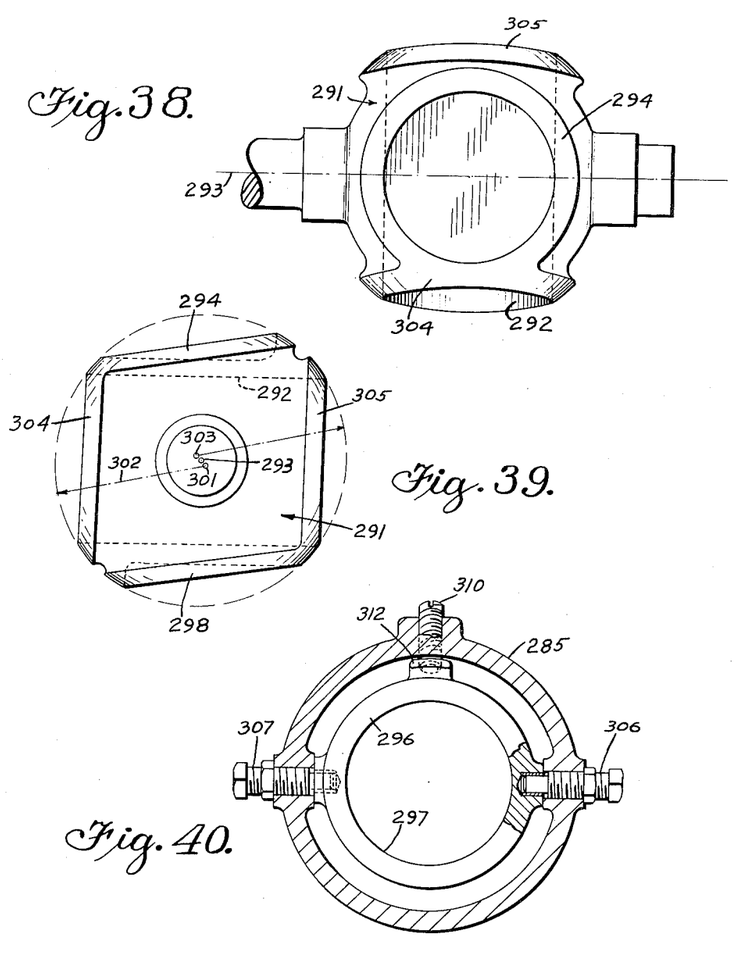
Fig. 38 is a plan view of the plug element utilized in the form of the valve shown in Figs. 36 and 37.
Fig. 39 is an end view thereof.
Fig. 40 is a sectional view, taken along a plane corresponding to line 40—40 of Fig. 37.

On the same center as the surface 294, there is another spherical surface 304 extending around the port 292 and merging with the surface 294, as shown most clearly in Fig. 38. Similarly, a spherical surface 305 is formed on the same center 303 as the surface 298, and merges with it, as indicated in Fig. 39.

These surfaces 305 and 304 cooperate with the seats 299 and 296, respectively, in the open position of Fig. 36 when the plug is rotated to that position.

The seat-forming members 297 and 300 are mounted for pivotal adjusting movement. The pair of pivot screws 306 and 307, illustrated in Fig. 40, serve to support the seat-forming member 297; and the same manner of pivotally supporting the seat-forming member 300 is provided. These seat-forming members accordingly can adjust themselves so as to nest properly with the cooperating surfaces both in the closed and open positions. In order to permit the wedging action, and to provide a tight seal, the resilient rubber, spherical-like members 308 and 309 are provided between these seat-forming members and the interior surface of the body 285—286.

Figure 37:
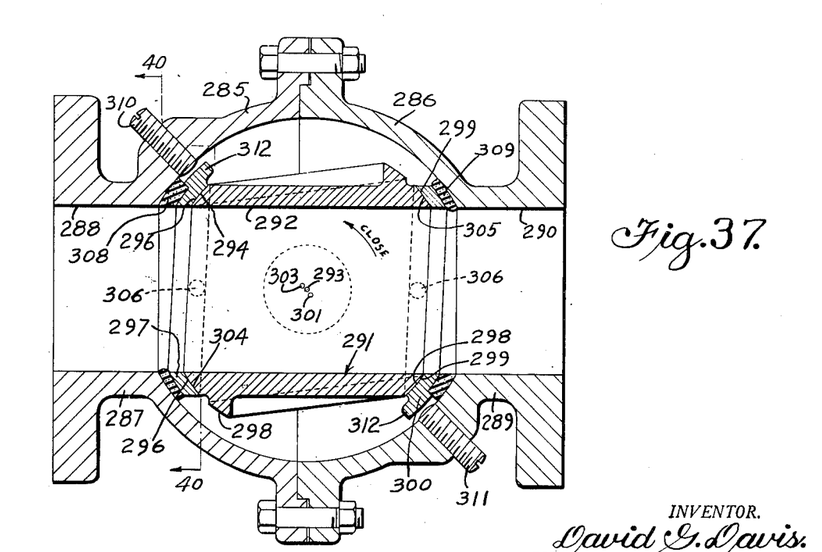
Fig. 37 is a view similar to Fig. 36, but with the valve shown in open position.

Thus, in turning the plug 291 from the closed position of Fig. 36 to the open position of Fig. 37, the rubber ring 309 is more greatly compressed at the top than at the bottom. In turning from the open position of Fig. 37 to the closed position of Fig. 36, the upper portion of ring 308 is more compressed, and its lower portion is less compressed, as indicated in Fig. 36.

Positive stops are provided for limiting the angular movement of the seat-forming members 297 and 300. This may be in the form of adjustable set screws 310 and 311 threaded into the body halves 285 and 286, and in diametric arrangement. These cooperate with the integral stops 312 carried by the seat-forming members 297 and 300.

The manner of operation of this form is such that a tight seating is accomplished in either of the two positions indicated in Figs. 36 and 37. A wedging action is secured by the eccentric surfaces defined by the zones 304, 294 on the one hand and the zones 305 and 298 on the other hand.

The inventor claims:

1. In a valve structure: a valve body having an inlet port and an outlet port; a ported plug in the body, rotatable about an axis, the extent of rotation between open and closed positions being substantially ninety degrees; said rotation from open to closed positions moving the port in the plug from a position substantially in alignment with the body ports, to one in which the port in the plug extends transversely between the body ports; and a mechanism for rotating said plug, comprising an arm fixed to the plug; a link pivoted at one end to the arm; and means connected to a point on said link spaced from the pivot for moving said point in a line substantially parallel to the line joining the axis of rotation of said plug and the pivot of said link when the plug is in closed position; the link axis defined by said pivot and point lying substantially normal to the line of movement when the valve is closed.

2. In a valve structure: a valve body having an inlet port and an outlet port; a ported plug in the body, rotatable about an axis, the extent of rotation between open and closed positions being substantially ninety degrees; said rotation from open to closed positions moving the port in the plug from a position substantially in alignment with the body ports, to one in which the port in the plug extends transversely between the body ports; and a mechanism for rotating said plug, comprising an arm fixed to the plug; a link pivoted at one end to the arm; and means connected to a point on said link spaced from the pivot for moving said point in a line substantially parallel to the line joining the axis of rotation of said plug and the pivot of said link when the plug is in closed position; the link axis defined by said pivot and point lying substantially normal to the line of movement when the valve is closed; the perpendicular distance between the line of movement and the parallel line joining said axis and pivot being substantially the same as the distance between the axis of rotation and the pivot of the link.

3. In a valve structure: a valve body having an inlet port and an outlet port; a ported plug in the body, rotatable about an axis, the extent of rotation between open and closed positions being substantially ninety degrees; said rotation from open to closed positions moving the port in the plug from a position substantially in alignment with the body ports, to one in which the port in the plug extends transversely between the body ports; and a mechanism for rotating said plug, comprising an arm fixed to the plug; a link pivoted at one end to the arm; and means connected to a point on said link spaced from the pivot for moving said point in a line substantially parallel to the line joining the axis of rotation of said plug and the pivot of said link when the plug is in closed position; the link axis defined by said pivot and point lying substantially normal to the line of movement when the valve is closed; the distance between said point and pivot being substantially one-third longer than the distance between the axis of the plug and the pivot axis connecting the link and the arm.

4. In a valve structure: a valve body having an inlet port and an outlet port; a ported plug in the body, rotatable about an axis; means providing a seat around one of the ports in the body; means providing a seat on the plug mating with said seat of said body when said plug is in closed position, the seat surfaces being substantially spherical, and the center of curvature of the surfaces being respectively offset from the axis of the plug; and a mechanism for rotating said plug, comprising an arm fixed to the plug, a link pivoted at one end to the arm, and means for moving the link in a direction that is substantially parallel to the line joining the axis of rotation and the pivot of the link when the plug is in closed position.

5. In a valve structure: a valve body having an inlet port and an outlet port; a ported plug in the body, rotatable about an axis; means providing an annular seat around one of the ports in the body; means providing an annular seat on the plug mating with said seat of said body when said plug is in closed position, the seat surfaces being substantially spherical, the axis of the annular surfaces substantially coinciding when the plug is in closed position, said axis of the annular surfaces in plug closing position being skew to the axis of rotation of said plug; and a mechanism for rotating said plug, comprising an arm fixed to the plug, a link pivoted at one end to the arm, and means for moving the link in a direction that is substantially parallel to the line joining the axis of rotation of the pivot of the link when the plug is in closed position.

6. In a valve structure: a valve body having an inlet port and an outlet port; a ported plug in the body, rotatable about an axis between open and closed positions, the ports in the body and the plug being in substantial alignment, when the plug is in open position, and a mechanism for rotating said plug, comprising an arm fixed to the plug, a link pivoted at one end to the arm, and means connected to a point on said link spaced from the pivot for moving said point, said last-mentioned means and link being relatively oriented to effect said movement of said point substantially along a line tangent to a circle having as its center the location of the link pivot when the valve is closed and having as its radius the spacing between said link pivot and point.

7. In a valve structure: a valve body having an inlet port and an outlet port; a valve closure member in the body, rotatable about an axis, and having an angular position in which flow of fluid between the ports is interrupted; and a mechanism for rotating the closure member comprising an arm fixed to the closure member, a link pivoted at one end to the arm, and means connected to a point on said link spaced from the pivot for moving said point, said last-mentioned means and link being relatively oriented to effect said movement of said point substantially along a line tangent to a circle having as its center the location of the link pivot when the valve is closed and having as its radius the spacing between said link pivot and point.

8. In a valve structure as defined in claim 6, the distance between the point and the pivot being substantially the same as the distance between the axis of rotation and the pivot.

9. In a valve structure as defined in claim 1, said means connected to said point for moving the same comprising a linearly movable head and means for moving the head, a pair of parallel guides for guiding the movement of the head, spacer blocks between the guides, means for clamping the blocks against the guides, and one or more pairs of struts, the struts of each pair respectively engaging the opposite guide.

References Cited in the file of this patent

UNITED STATES PATENTS

| Number | Name | Date |
|---|---|---|
| 341,410 | Dummer | May 4, 1886 |
| 1,161,460 | Doble | Nov. 23, 1915 |
| 1,442,452 | Taylor | Jan. 16, 1923 |
| 1,513,457 | Jackson | Oct. 28, 1924 |
| 1,640,527 | Brown | Aug. 30, 1927 |
| 1,646,631 | Schnyder | Oct. 25, 1927 |
| 1,662,659 | Bernstock | Mar. 13, 1928 |
| 1,679,779 | Oberhuber | Aug. 7, 1928 |
| 1,679,907 | La Bour | Aug. 7, 1928 |
| 1,683,555 | Key | Sept. 4, 1928 |
| 1,715,293 | Hubbard | May 28, 1929 |
| 2,015,849 | Hardies | Oct. 1, 1935 |
| 2,034,291 | Gannestad | Mar. 17, 1936 |
| 2,076,840 | Heggem | Apr. 13, 1937 |
| 2,153,885 | Goldberg | Apr. 11, 1939 |
| 2,169,526 | Goldberg | Aug. 15, 1939 |
| 2,206,223 | Dearborn | July 2, 1940 |
| 2,243,845 | Goit | June 3, 1941 |
| 2,299,119 | Yoemans | Oct. 20, 1942 |
| 2,334,019 | McFeaters | Nov. 9, 1943 |
| 2,383,549 | Hilker | Aug. 28, 1945 |
| 2,445,227 | Le Clair | July 13, 1948 |
| 2,494,091 | Harris | Jan. 10, 1950 |
| 2,533,931 | Hartley | Dec. 12, 1950 |
| 2,565,640 | White | Aug. 28, 1951 |
| 2,577,725 | Drake | Dec. 11, 1951 |
| 2,600,898 | Maxwell | June 17, 1952 |
| 2,663,538 | Bacchi | Dec. 22, 1953 |

FOREIGN PATENTS

| Number | Country | Date |
|---|---|---|
| 3,093 | Great Britain | of 1893 |
| 248,968 | Italy | of 1926 |
| 66,143 | Sweden | of 1927 |
| 213,331 | Germany | of 1909 |